(12) United States Patent
Bangor et al.

(10) Patent No.: US 9,118,866 B2
(45) Date of Patent: *Aug. 25, 2015

(54) AURAL INDICATION OF REMOTE CONTROL COMMANDS

(71) Applicant: AT&T Intellectual Property I, L.P., Atlanta, GA (US)

(72) Inventors: Aaron Bangor, Austin, TX (US); Harry E. Blanchard, Rumson, NJ (US); Jeffrey Brandt, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/901,373

(22) Filed: May 23, 2013

(65) Prior Publication Data

US 2013/0263204 A1 Oct. 3, 2013

Related U.S. Application Data

(63) Continuation of application No. 11/866,411, filed on Oct. 2, 2007, now Pat. No. 8,528,040.

(51) Int. Cl.
*H04N 5/44* (2011.01)
*H04B 1/20* (2006.01)
*G10L 13/02* (2013.01)

(52) U.S. Cl.
CPC ............ *H04N 5/4403* (2013.01); *H04B 1/202* (2013.01); *G10L 13/02* (2013.01)

(58) Field of Classification Search
CPC . H04B 1/202; H04N 21/4882; H04N 5/4403; H04N 2005/4432; H04N 21/478; G09B 21/006; G10L 13/00; H04M 3/42042; H04M 1/578; H04M 3/42059
See application file for complete search history.

(56) References Cited

U.S. PATENT DOCUMENTS

| | | | |
|---|---|---|---|
| 5,774,859 A | 6/1998 | Houser et al. | |
| 5,915,066 A | 6/1999 | Katayama | |
| 6,198,825 B1 | 3/2001 | Daryanani | |
| 6,233,460 B1 | 5/2001 | Nojima | |
| 6,535,590 B2 | 3/2003 | Tidwell et al. | |
| 6,654,721 B2 * | 11/2003 | Handelman | 725/39 |
| 6,915,528 B1 | 7/2005 | McKenna, Jr. | |
| 7,299,182 B2 | 11/2007 | Xie | |
| 7,483,834 B2 | 1/2009 | Naimpally et al. | |
| 8,009,812 B2 * | 8/2011 | Bruce et al. | 379/88.13 |

(Continued)

*Primary Examiner* — Hai V Tran
(74) *Attorney, Agent, or Firm* — Jackson Walker L.L.P.

(57) ABSTRACT

A disclosed set top box or other multimedia receiver suitable for use in a multimedia distribution network includes a remote control interface operable to receive a signal from a remote control device and extract a remote control command from the signal, a processor coupled to the remote control interface and operable to detect the remote control command, and a machine readable storage resource containing computer executable instructions operable to: invoke an aural indication application that returns an audio stream suitable for processing by an audio output device, wherein the audio stream, when processed by the audio output device, causes the audio output device to produce an audibly detectable signal indicative of a function corresponding to the remote control command. The application may generate the audio stream by invoking a speech synthesis module or by retrieving an audio file. The application may retrieve electronic programming guide (EPG) data associated with a remote control command and incorporate at least some of the EPG data in the audibly detectable output.

17 Claims, 8 Drawing Sheets

(56) References Cited

U.S. PATENT DOCUMENTS

| | | |
|---|---|---|
| 2003/0105639 A1* | 6/2003 | Naimpally et al. ........... 704/276 |
| 2004/0168187 A1 | 8/2004 | Chang |
| 2004/0268420 A1 | 12/2004 | Addington et al. |
| 2005/0157215 A1 | 7/2005 | Minnick et al. |
| 2005/0212685 A1 | 9/2005 | Gordon |
| 2006/0041926 A1 | 2/2006 | Istvan et al. |
| 2006/0170582 A1 | 8/2006 | Kortum et al. |
| 2006/0271968 A1 | 11/2006 | Zellner |
| 2007/0130588 A1* | 6/2007 | Edwards et al. ................ 725/59 |
| 2009/0083801 A1* | 3/2009 | Hardacker et al. .............. 725/56 |

* cited by examiner

AURAL INDICATION OF REMOTE CONTROL COMMANDS

The present patent application is a continuation of U.S. patent application Ser. No. 11/866,411, filed Oct. 2, 2007, the entirety of which is hereby incorporated by reference.

BACKGROUND

1. Field of the Disclosure

The present disclosure relates to multimedia systems and more particularly, remote control devices for use with such systems.

2. Description of the Related Art

People with visual impairments cannot read the button labels on remote controls, either because they have no vision or because the limited space on remote controls results in lettering that is too small to read. An estimated ten million Americans have a visual impairment of some kind and the number is only expected to grow as Baby Boomers age. This inability to read labels is a major barrier to the use and enjoyment of many electronic products for these people. Frequently, for example, a visually impaired user must essentially memorize the function associated with each button on a remote control device. Even for well sighted persons, reading the labels on remote control devices may be impractical if the ambient light is insufficient. While there have been efforts to address this problem using remote controls with built-in audio resources, these remotes require additional hardware, drain batteries faster than conventional remote controls, and have limited functionality.

DESCRIPTION OF THE EMBODIMENT(S)

Figure 1:
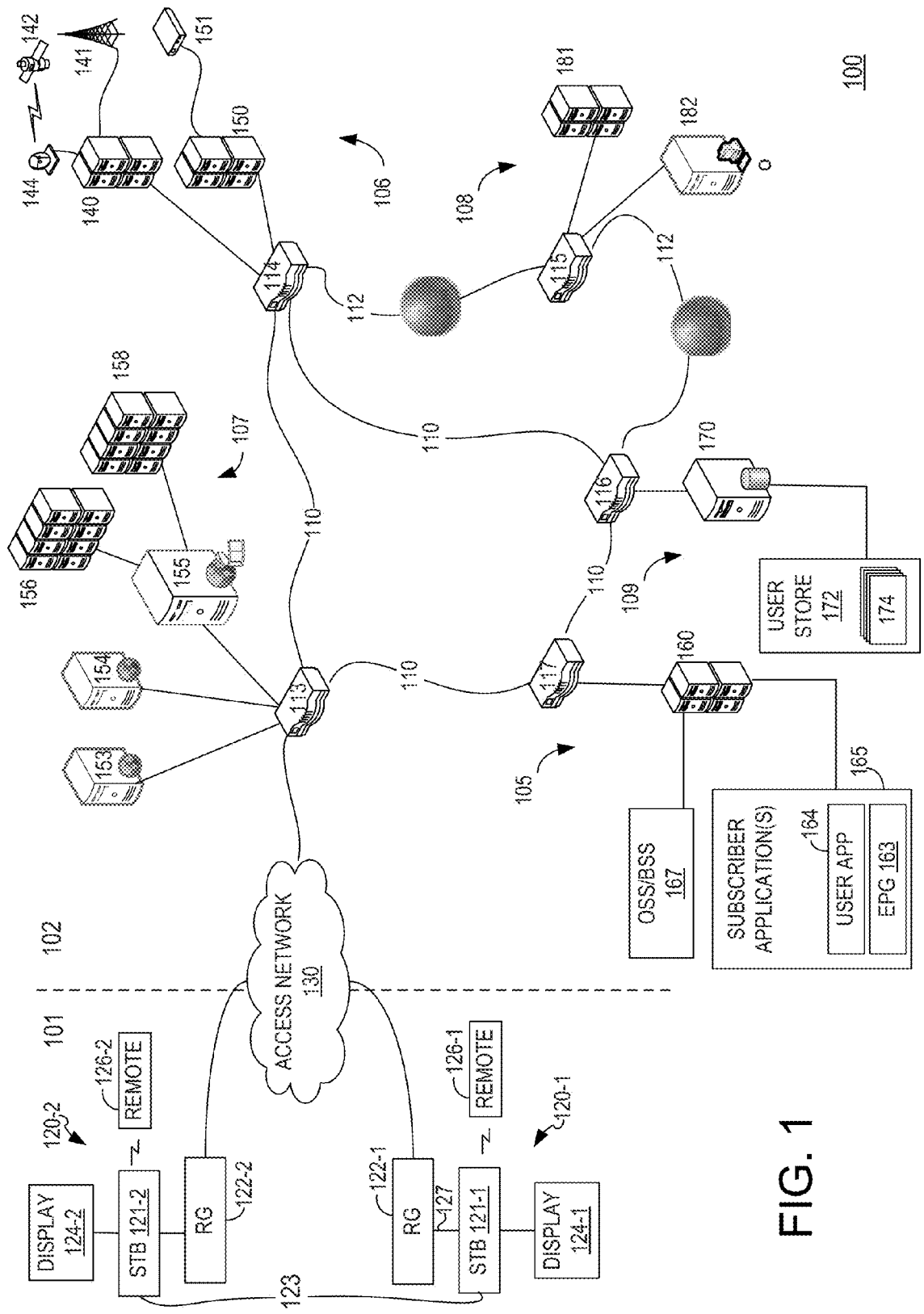
FIG. 1 is a block diagram of selected elements of a multimedia content distribution network.

In one aspect, a disclosed set top box or other type of multimedia receiver suitable for use in a multimedia distribution network includes a remote control interface that receives a signal from a remote control device and extracts a remote control command from the signal. A processor within the receiver, coupled to the remote control interface, detects the remote control command. The receiver includes a machine readable storage resource in which an aural indication application is stored. The processor invokes the aural indication application and the application returns an audio stream suitable for processing by an audio output device. The audio stream, when processed by the audio output device, causes the audio output device to produce an audibly detectable signal indicative of a function corresponding to the remote control command. The receiver may also execute a control procedure corresponding to the remote control command, e.g., change the channel, change the volume, etc. The audibly detectable signal may include a speech component and may be generated using a text-to-speech application or by indexing and retrieving stored audio files. In some cases, the audible indication may include information regarding multimedia content selected by the remote control command. The audible indication may also be customized to produce an audibly detectable signal in the speech of someone familiar to the user.

In the following description, details are set forth by way of example to provide a thorough explanation of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, element 102-1 refers to an instance of an element class, which may be referred to collectively as elements 102 and any one of which may be referred to generically as an element 102.

Before describing details of applications, disclosed herein, for use in conjunction with a multimedia content distribution network, selected aspects of the network and selected devices used to implement the network are described to provide context for at least some implementations.

Distribution of multimedia content, including television and video on-demand content, via a wide area network encompassing multiple subscribers or end users is well known. Some multimedia distribution networks including, for example traditional coaxial-based "cable" networks, continuously distribute or "push" a composite signal that includes all or a large number of the channels offered. The different channels are modulated onto corresponding frequency bandwidths within the composite signal. A tuner within a set top box, television, or other receiver selects a channel from the composite signal to play or record. Many of these composite signal networks are largely unidirectional and highly proprietary.

In contrast to composite signal networks, other networks including, for example, Internet Protocol Television (IPTV) systems may distribute one or a relatively small number of channels to a user at any given time based on the needs of the user. As suggested by their name, IPTV networks leverage pervasive network, technologies, standards, and infrastructure including, to some extent the Internet and the Internet Protocol (IP). In some IPTV networks, content is provided to the user over a physical connection that includes the "local loop" or "last mile" of a conventional telephone system. In these implementations, a subscriber's telephone lines may be used in combination with a residential gateway (RG), a digital subscriber line (DSL) modem to provide basic network communication functionality. A set-top box (STB) or other similar device connected to the RG provides functionality needed to decode video streams provided via the network and format resulting contents for display on a digital television, monitor, or other similar display device.

The inherent bidirectionality and the pervasiveness of the network technologies underlying IPTV offer the prospect of greater interactivity and a more flexible, extensible, and diverse set of features IPTV networks are particularly suited for deploying network based applications and features.

In the following description, details are set forth by way of example to provide a thorough explanation of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred collectively as widgets 102 and any one of which may be referred to generically as a widget 102.

Before describing details of applications, disclosed herein, for use in conjunction with a multimedia content distribution network, selected aspects of the network and selected devices used to implement the network are described to provide context for at least some implementations.

Television programs, video on demand, radio programs including music programs, and a variety of other types of multimedia content may be distributed to multiple subscribers over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The enormous bandwidth required to transport simultaneously large numbers of multimedia channels is a source of constant challenge for cable-based providers. In these types of networks, a tuner within a STB, television, or other form of receiver, is required to select a channel from the mixed signal for playing or recording. A subscriber wishing to play or record multiple channels typically needs to have distinct tuners for each desired channel. This is an inherent limitation of cable networks and other mixed signal networks.

In contrast to mixed signal networks, IPTV (Internet Protocol Television) networks generally distribute content to a subscriber only in response to a subscriber request so that, at any given time, the number of content channels being provided to a subscriber is relatively small, e.g., one channel for each operating television plus possibly one or two channels for recording. As suggested by the name, IPTV networks typically employ Internet Protocol (IP) and other open, mature, and pervasive networking technologies. Instead of being associated with a particular frequency band, an IPTV television program, movie, or other form of multimedia content is a packet-based stream that corresponds to a particular network address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address that is associated with the desired channel.

IPTV may be implemented, at least in part, over existing infrastructure including, for example, existing telephone lines, possibly in combination with customer premise equipment (CPE) including, for example, a digital subscriber line (DSL) modem in communication with a set-top box (STB), a display, and other appropriate equipment to receive multimedia content from a network and convert such content into usable form. In some implementations, a core portion of an IPTV network is implemented with fiber optic cables while the so-called last mile may include conventional unshielded twisted pair copper cables.

IPTV networks support bidirectional (i.e., two-way) communication between a subscriber's CPE and a service provider's equipment. Bidirectional communication allows a service provider to deploy advanced features, such as video-on-demand (VoD), pay-per-view, advanced programming information including sophisticated and customizable programming guides, and the like. Bidirectional networks may also enable a service provider to collect information related to a subscriber's preferences, whether for purposes of providing preference based features to the subscriber, providing potentially valuable information to service providers, or potentially lucrative information to content providers and others.

Because they are rooted in historically computer-based networking, IPTV networks are generally more adept at offering features that extend traditional television including, for example, networked interactive gaming and other network hosted applications.

Referring now to the drawings, FIG. 1 illustrates selected aspects of an embodiment of a multimedia content distribution network (MCDN) 100. MCDN 100 as shown may be generally divided into a client side 101 and a service provider side 102, sometimes also referred to simply as a server side, 102. The client side 101 includes all or most of the resources depicted to the left of access network 130 while the server side encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed either as fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some of these embodiments, private network 110 includes a fiber optic wide area network (WAN), referred to herein as the fiber backbone, and one or more video hub offices (VHOs). In large scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve scarce and valuable bandwidth by limiting the content that is transmitted over the core network and injecting regional content "downstream" from the core network.

Segments of private network 110 as shown in FIG. 1 are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the world wide web icon.

As shown in FIG. 1, the client side 101 of MCDN 100 depicts two of a potentially large number of client side resources referred to herein simply as client(s) 120. Each client 120 as shown includes an STB 121, an RG 122, a display 124, and a remote control device 126. In the depicted embodiment, STB 121 communicates with server side devices through access network 130 via RG 122.

RG 122 may include elements of a broadband modem such as a DSL modem, as well as elements of a router and/or access point for an Ethernet or other suitable local area network (LAN) 127. In this embodiment, STB 121 is a uniquely addressable Ethernet compliant device. In some embodiments, display 124 may be any NTSC and/or PAL compliant display device. Both STB 121 and display 124 may, but do not necessarily include any form of conventional frequency tuner.

Remote control device 126 communicates wirelessly with STB 121 using an infra red (IR) or RF signal. IR-based remote control devices are economical but limited to line of sight operation whereas RF-based remote control devices are omni-directional, but more expensive to implement and more demanding in terms of power consumption, which is an important consideration for a battery based device.

In IPTV compliant implementations of MCDN 100, the clients 120 are operable to receive packet-based multimedia streams from access network 130 and process the streams for presentation on display 124. In addition, clients 120 are network-aware systems that may facilitate bidirectional networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as RDP (reliable datagram protocol) over UDP/IP (user datagram protocol/internet protocol) as well as more conventional web protocols such as HTTP (hypertext transport protocol) over TCP/IP (transport control protocol).

The server side 102 of MCDN 100 as depicted in FIG. 1 emphasizes network capabilities including application resources 105, which may or may not have access to database resources 109, content acquisition resources 106, content delivery resources 107, and OSS/BSS resources 108.

Before distributing multimedia content to subscribers, MCDN 100 must first obtain multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a video on demand (VoD) acquisition server 150. VoD acquisition server 150 receives content from one or more VoD sources that may be external to the MCDN 100 including, as examples, discs represented by a DVD player 151, or transmitted feeds (not shown). VoD acquisition server 150 may temporarily store multimedia content for transmission to a VoD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a WMV (Windows Media Video) family codec, or another suitable video codec. Encoding acquired content is desirable to compress the acquired content to preserve network bandwidth and network storage resources and, optionally, to provide encryption for securing the content. VoD content acquired by VoD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VoD delivery server 158. For purposes of this disclosure, the use of the term "live" or "real-time" in connection with content server 156 is intended primarily to distinguish the applicable content from the content provided by VoD delivery server 158. The content provided by a VoD server is sometimes referred to as time-shifted content to emphasize the ability to obtain and view VoD content substantially without regard to the time of day or day of week.

Content delivery server 155, in conjunction with live content server 156 and VoD delivery server 158, responds to subscriber requests for content by providing the requested content to the subscriber. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver, e.g., STB 121 of client 120, where the content is parsed from individual packets and re-assembled into multimedia content suitable for processing by a set top box decoder.

Subscriber requests received by content delivery server 155 include an indication of content that is being requested. In some embodiments, this indication includes an IP address associated with the desired content. For example, a particular local broadcast television station may be associated with a particular channel and the feed for that channel may be associated with a particular IP address. When a subscriber wishes to view the station, the subscriber may interact with remote control 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request by making a streaming video signal accessible to the subscriber. Content delivery server 155 may employ unicast and broadcast techniques when making content available to a subscriber. In the case of multicast, content delivery server 155 employs a multicast protocol to deliver a single originating stream to multiple clients. When a new subscriber requests the content associated with a multicast stream, there is generally latency associated with updating the multicast information to reflect the new subscriber as a part of the multicast group. To avoid exposing this undesirable latency to the subscriber, content delivery server 155 may temporarily unicast a stream to the requesting subscriber. When the subscriber is ultimately enrolled in the multicast group, the unicast stream is terminated and the subscriber receives the multicast stream. Multicasting desirably reduces bandwidth consumption by reducing the number of streams that must be transmitted over the access network 130 to clients 120.

As illustrated in FIG. 1, a client-facing switch 113 provides a conduit between subscriber side 101, including client 120, and server side 102. Client-facing switch 113 as shown is so named because it connects directly to the client 120 via access network 130 and it provides the network connectivity of IPTV services to consumers' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188 byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen set-top boxes, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VoD content, and other services. If client gateway 153 cannot verify subscriber information for STB 121, for example, because it is connected to an unauthorized twisted pair or residential gateway, client gateway 153 may block transmissions to and from STB 121 beyond the private access network 130.

MCDN 100 as depicted includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an electronic programming guide (EPG) application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a subscriber. User application 164 is illustrated in FIG. 1 to emphasize the ability to extend the network's capabilities by implementing a networked hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource 172, also referred to herein as user store 172. User store 172 as shown includes one or more user profiles 174 where each user profile includes account information and may include preferences information that may be retrieved by applications executing on application server 160 including subscriber application 165.

MCDN 100 as shown includes an OSS/BSS resource 108 including an OSS/BSS switch 115. OSS/BSS switch 115 as shown facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Figure 2:
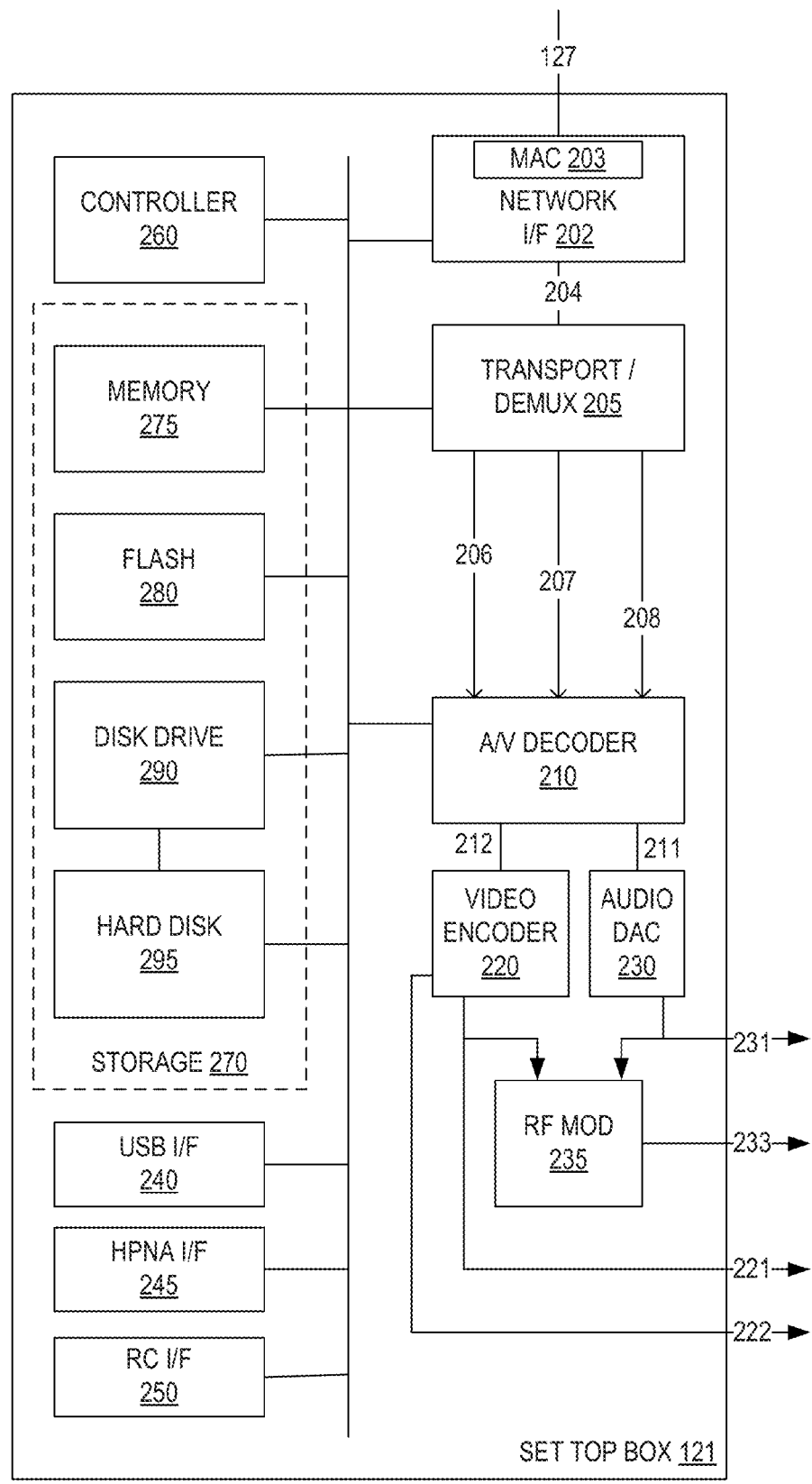
FIG. 2 is a block diagram of selected elements of a set top box suitable for use in the network of FIG. 1.

Turning now to FIG. 2, selected components of an embodiment of the STB 121 in the IPTV client 120 of FIG. 1 are illustrated. Regardless of the specific implementation, of which STB 121 as shown in FIG. 2 is but an example, an STB 121 suitable for use in an IPTV client includes hardware and/or software functionality to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content.

In the embodiment depicted in FIG. 2, STB 121 includes a general purpose processing core represented as controller 260 in communication with various special purpose multimedia modules. These modules may include a transport/de-multiplexer module 205, an A/V decoder 210, a video encoder 220, an audio DAC 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general purpose digital signal processor (DSP) and supporting software.

Regardless of the implementation details of the multimedia processing hardware, STB 121 as shown in FIG. 2 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to the twisted pair or other form of physical network medium and supporting low level addressing using MAC addressing. In these embodiments, every network interface 202 includes a globally unique 48-bit MAC address 203 stored in a ROM or other persistent storage element of network interface 202. Similarly, at the other end of the LAN connection 127, RG 122 has a network interface (not depicted) with its own globally unique MAC address.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

The digital multimedia stream 204 is a sequence of digital information that includes interlaced audio data streams and video data streams. The video and audio data contained in digital multimedia stream 204 may be referred to as "in-band" data in reference to a particular frequency bandwidth that such data might have been transmitted in an RF transmission environment. Multimedia stream 204 may also include "out-of-band" data which might encompass any type of data that is not audio or video data, but may refer in particular to data that is useful to the provider of an IPTV service. This out-of-band data might include, for example, billing data, decryption data, and data enabling the IPTV service provider to manage IPTV client 120 remotely.

Transport/demux 205 as shown is operable to segregate and possibly decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including an IR interface 250 suitable for use with an IR remote control unit (not shown) and a front panel interface (not shown).

A/V decoder 210 processes digital audio, video, and out-of-band streams 206, 207, and 208 to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder.

The digital out-of-band stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to the display 124, perhaps in response to a signal from a remote control device.

The native format digital audio stream 211 as shown in FIG. 2 is routed to an audio DAC 230 to produce an audio output signal 231. The native format digital video stream 212 is routed to an NTSC/PAL or other suitable video encoder 220, which generates digital video output signals suitable for presentation to an NTSC or PAL compliant display device 204. In the depicted embodiment, for example, video encoder 220 generates a composite video output signal 221 and an S video output signal 222. An RF modulator 235 receives the audio and composite video outputs signals 231 and 221 respectively and generates an RF output signal 221 suitable for providing to an analog input of display 204.

In addition to the multimedia modules described, STB 121 as shown includes and various peripheral interfaces. STB 121 as shown includes, for example, a USB interface 240 and a local interconnection interface 245. Local interconnection interface 245 may, in some embodiments, support the HPNA or other form of local interconnection 123 shown in FIG. 1.

The illustrated embodiment of STB 121 includes storage resources 270 that are accessible to controller 260 and possibly one or more of the multimedia modules. Storage 270 may include DRAM or another type of volatile storage identified as memory 275 as well as various forms of persistent or nonvolatile storage including flash memory 280 and/or other suitable types of persistent memory devices including ROMs, EPROMs, and EEPROMs. In addition, the depicted embodiment of STB 121 includes a mass storage device in the form of one or more magnetic hard disks 295 supported by an IDE compliant or other type of disk drive 290. Embodiments of STB 121 employing mass storage devices may be operable to store content locally and play back stored content when desired.

Figure 3:
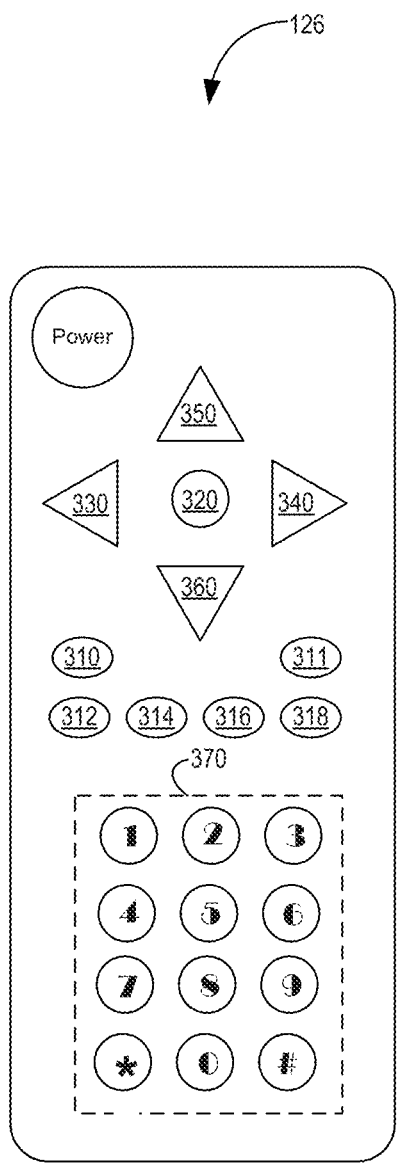
FIG. 3 depicts a remote control device.

FIG. 3 illustrates an exemplary remote control 126 suitable for use with STB 121. The buttons and functionality of remote control 126 is described to illustrate basic functionality and are not intended to limit other possible functionality that may be incorporated into other embodiments. For example, although not shown, the buttons or indicators of remote control 126 may include a button, a knob, or a wheel for receiving input.

In the embodiment depicted in FIG. 3, remote control 126 has various function buttons 310, 311, 312, 314, 316, and 318, a "select" button 320, a "backward" or left-ward button 330, a "forward" or right-ward button 340, an "upward" button 350, and a "downward" button 360. The number, shape, and positioning of buttons 310 through 360 is an implementation detail and other embodiments may employ more or fewer buttons of the same or different shapes arranged in a similar or dissimilar pattern. The "select" button 320 may be used to request a channel to be viewed on the full display to the exclusion of other icons, menus, thumbnails, line-ups and/or other items. Button 320 may additionally be considered an "Enter" button or an "OK" button. Key pad 370 as shown is a numeric keypad that permits a user an option of selecting channels by entering numbers as is well known. In other embodiments, key pad 370 may be an alphanumeric keypad including a full or partially full set of alphabetic keys. In conjunction with an aural indication application described below, one or more of the function buttons 310 through 318 may be used to enable, disable, or facilitate aural indication functionality.

Figure 4:
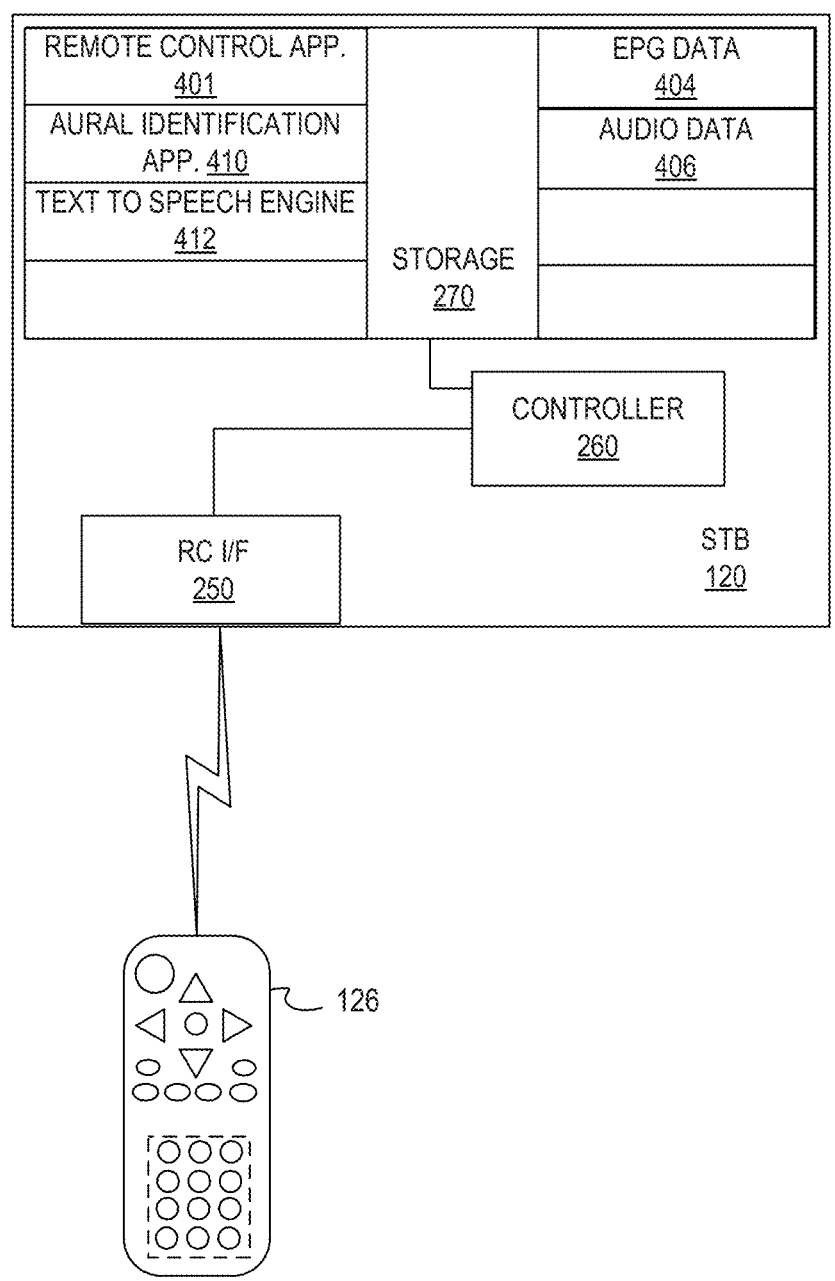
FIG. 4 depicts elements of a set top box of FIG. 2 enabling aural indication of remote control commands.

Turning now to FIG. 4, selected software elements of an STB 121 operable to support an aural indication of remote control command feature are illustrated. In the depicted implementation, the storage 270 of STB 121 includes a program or execution module identified as remote control application 401 and a module identified as aural indication application 410. In addition, the depicted implementation of storage 270 includes data objects identified as EPG data 404 and audio data 406.

Remote control application 401 includes code that supports the STB's 121 remote control functionality. When a user depresses a volume button on remote control 126, remote control application 401 includes code to modify the volume signal being generated by STB 121. In some embodiments, remote control application 401 is invoked by controller 260 in response to a signal from RC I/F 250 indicating that RC I/F 250 has received a remote control command signal. Although the embodiments described herein employ a wireless remote control device 126 to convey user commands to STB 121, the user commands may be conveyed to STB 121 in other ways. For example, STB 121 may include a front panel having function buttons that are associated with various commands, some of which may coincide with commands associated with function buttons on remote control device 126. Similarly, although remote control device 126 is described herein as being an IF or IR remote control device, other embodiments may use other media and/or protocols to convey commands to STB 121. For example, remote control commands may be conveyed to STB 121 via USB (Universal Serial Bus), WiFi (IEEE 802.11-family protocols), and/or Bluetooth techniques, all of which are well known in the field of network communications.

RC I/F 250 may be operable to parse or otherwise extract the remote control command that is included in the signal. The remote control command may then be made available to controller 260 and/or remote control application 401. In this manner, remote control application 401 may receive an indication of the remote control command from the RC I/F 250 directly or from controller 260. In the latter case, for example, controller 260 might call remote control application 401 as a function call and include an indication of remote control 126 as a parameter in the function call.

STB 121 as shown in FIG. 4 also includes aural indication application 410 that may work in conjunction with remote control application 401. In some embodiments, including an embodiment of STB 121 functionality conceptually depicted in FIG. 5, STB 121 is operable to detect (block 502) a remote control command from RC I/F 250. The depicted embodiment of STB 121 responds to detecting the remote control command by invoking remote control application 401 to perform (block 504) a function corresponding to the detected remote control command. For example, if the detected remote control command is a change channel command, remote control application 401 is responsible for causing STB 121 to change its channel indicator and to decode and present for display multimedia content corresponding to the new channel.

Figure 5:
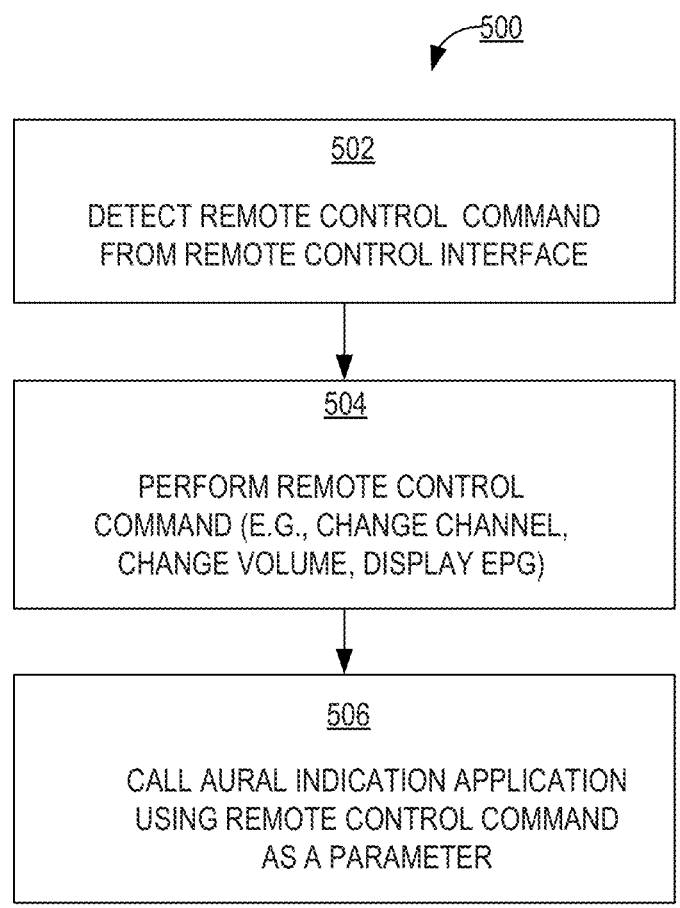
FIG. 5 is a flow diagram representing selected elements of a method of set top box operation.

In addition to performing the function associated with a remote control command, STB 121 as implemented in FIG. 5 may then call (block 506) an aural indication application 410, again using the remote control command as a parameter provided to the aural indication application. The aural indication application, as illustrated in greater detail in FIG. 6, causes STB 121 to output an audio sequence that is indicative of the remote control command and, more specifically, indicative of the function executed by STB 121 in response to receiving the remote control command from the remote control 126. Whereas remote control units exist that have speakers and rudimentary speech capability, these units are only capable of "speaking" the button that is pressed on the remote control device. A button may, however, cause an STB to do different things depending upon the state of the STB when the button is pressed. A benefit of porting the audible indication functionality from the remote control to the STB is that the STB can provide an indication of the resulting function as opposed to the remote control button that was pressed.

Figure 6:
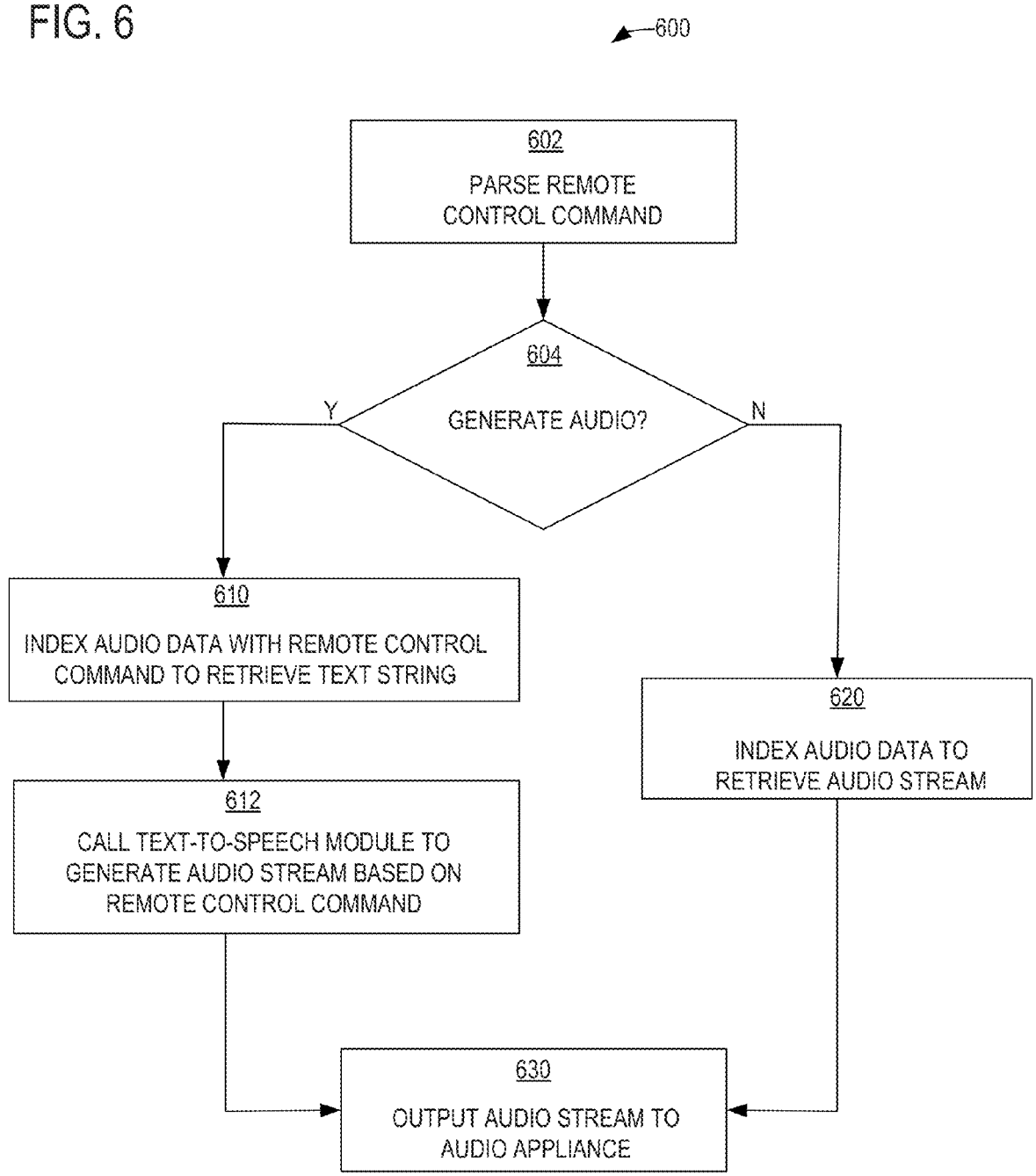
FIG. 6 is a flow diagram depicting selected elements of an aural indication application.

Referring now to FIG. 6, selected elements of an embodiment of an aural indication application 600 are depicted. In the depicted embodiment, aural indication application 600 parses (block 602) the remote control command or receives the remote control command as a parameter from the controller 260 when it invokes the application.

Audible output application 600 as shown in the depicted implementation supports two processes for generating speech or other forms of aural indication. The two processes are referred to herein as generated speech and retrieved speech. In block 604, the depicted embodiment of application 600 determines whether the audio output will be generated or retrieved. If audio is to be generated, application 600 invokes a text-to-speech engine that derives the audio output from a text-based representation of the remote control command. Under this process, for example, application 600 may index (block 610) audio data 406, which may contain text strings corresponding to a set of remote control commands. Application 600 would index or otherwise retrieve the applicable text string from audio data 406 and call (block 612) a text-to-speech engine 412, which converts the text string to audio data using known text-to-speech techniques.

As an alternative, application 600 may determine in block 604 that speech is not to be generated, which may occur if, for example, STB 121 lacks text-to-speech engine 412. In any event, application 600 may store audio files corresponding to each of the remote control commands in audio data 406. In this embodiment, application 600 may use the remote control command to index (block 620) audio data 406 to retrieve an audio file that is suitable for delivering to decoder 210 of STB 121.

The text-to-speech process is more flexible and potentially conserves valuable storage because it is not necessary to store audio files. On the other hand, the retrieval of audio files has the benefit of better performance because very little on-the-fly processing is required. Application 600 as shown supports both processes. In other implementations, application 600 may be dedicated to one approach or the other. Still other implementations may employ a combination of both text-to-speech and stored audio files, for example, using stored audio files for the most commonly invoked words and text-to-speech for less frequently encountered words.

Figure 7:
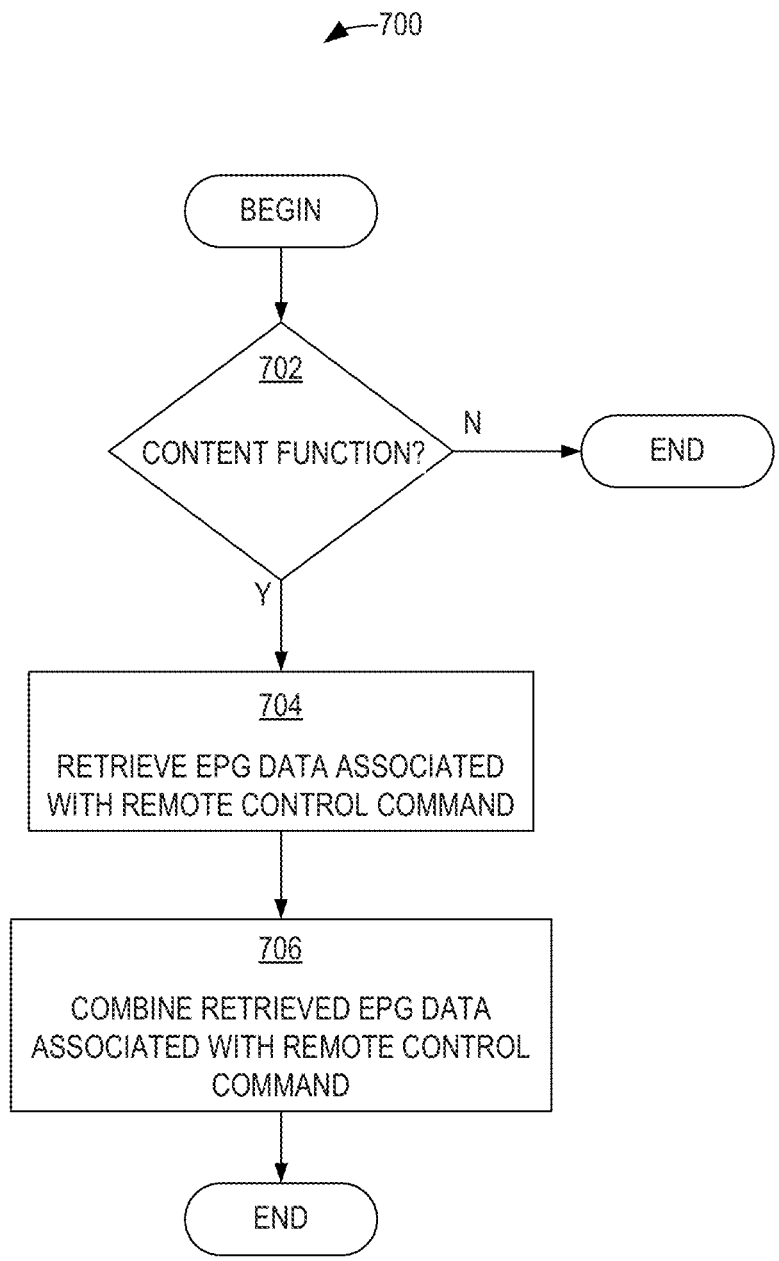
FIG. 7 is a flow diagram illustrating an aural indication feature in which the aural indication includes an indication of content selected in response to a remote control command.
Figure 8:
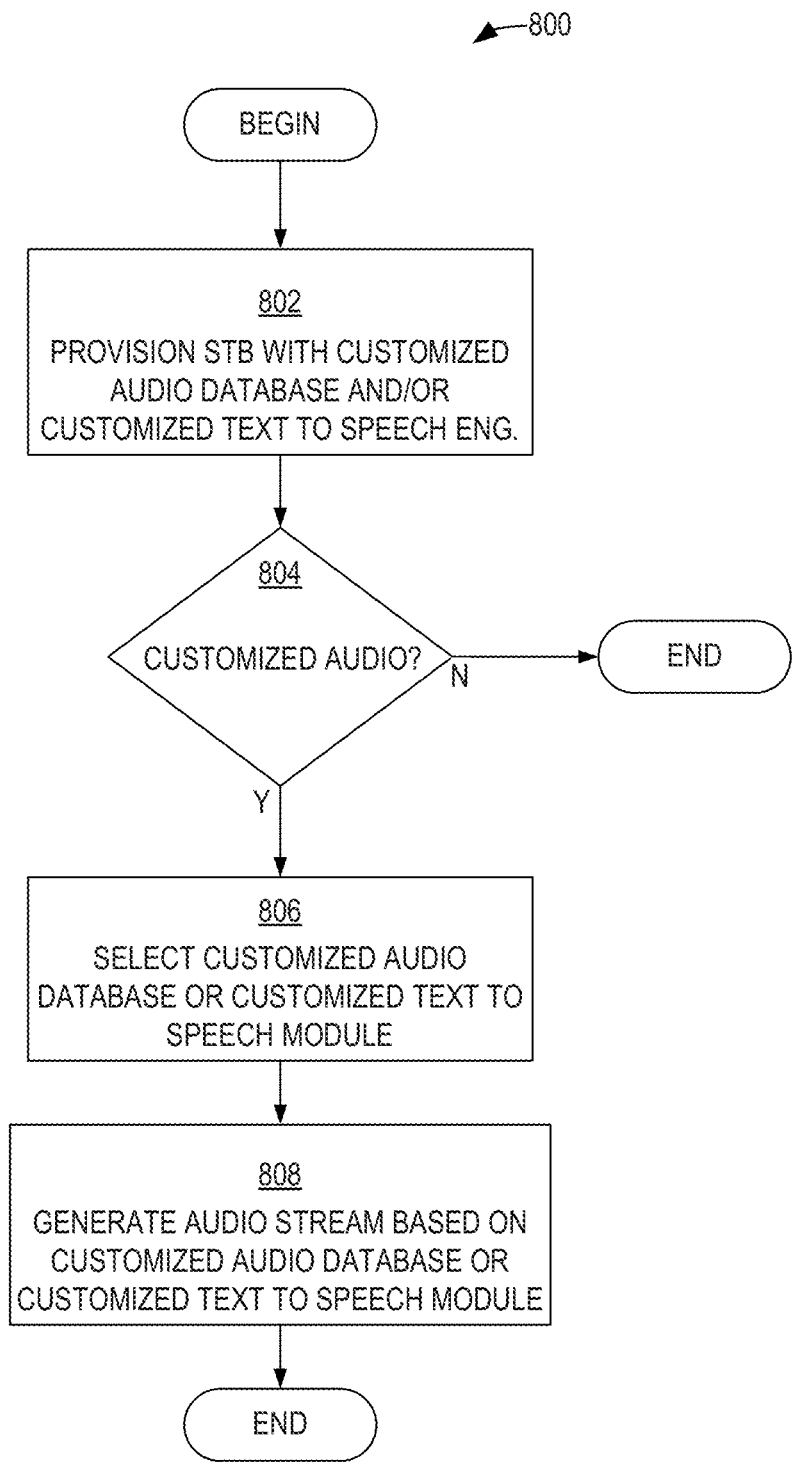
FIG. 8 is a flow diagram illustrating a customizable aural indication feature.

Referring now to FIG. 7 and FIG. 8, additional and optional features of an audible output application are depicted. FIG. 7 depicts selected elements of a process 700 that incorporates meta data into the aural indication functionality. As an example, if (block 702) the viewer initiates a remote control command that affects the content being displayed, the application may retrieve (block 704) meta data associated with the remote control command. In the depicted embodiment, the retrieved meta data that is associated with a remote control command includes EPG data 404 that is associated with the content being displayed after the command is executed. Thus, when a user changes to a new channel, the name of the program may be retrieved from the EPG data 404, combined (block 706) with the remote control command, and output as part of the aural indication. These features may be implemented with the text-to-speech approach or with the audio file retrieval approach although there are practical limits on the ability to incorporate the audio files necessary to keep pace with the rate at which EPG data 404 or other form of meta data changes. In other embodiments, the retrieved meta data may include, as examples, verbal descriptions of images associated with video-on-demand content, CallerID information associated with incoming telephone calls that may be detected or processed by STB 121, system messages including, as an example, "recording finished," and the like.

FIG. 8 illustrates a feature 800 in which an STB 121 is provisioned (block 802) with a customized audio database and/or a customized text-to-speech engine. The customized audio data or speech engine may produce aural indications in a voice that is familiar to the user such as the voice of a family member or the voice of a celebrity. In the case of a family member, the customized audio files may be recorded and downloaded to the set top box storage using a USB or other suitable interface. If the customized audio feature is enabled (block 804), the application selects (block 806) the customized audio database or customized text-to-speech engine and generates (block 808) an audio stream based thereon.

Referring back to FIG. 3, some embodiments of the aural indication application may operate in conjunction with remote control device 126 to enable, disable, facilitate or enhance the aural indication functionality. In some embodiments, for example, aural indication application 410 may recognize a function button, e.g., function button 311, as an enable/disable button that toggles whether the aural indication is played when another button is pressed. In these embodiments, function button 311 enables and disables the aural indication function. A default setting for a variable controlled by function button 311 could be a user specifiable default setting that is set either on or off as a preference on STB 121. The enable/disable feature could, in other embodiments, be implemented via a slide switch (not depicted) instead of a button. In other embodiments, aural indication application recognizes button 311, or another function button, as an "audio next" function button that, when pressed, causes aural indication of the next button pressed. Other embodiments may employ a variant of this approach in which aural indication application 410 causes aural indication of a button when it is pressed a first time. A second pressing of the same button activates the button as normal. Alternatively, the remote control 126 may be implemented so that simply touching a button (i.e., sensed through capacitance variation) causes the aural indication to play while actually pressing the button causes the appropriate command to execute. Similarly, STB 121 can be configured, depending on user input or preferences, to play aural indication for buttons that are pressed, but not execute the corresponding functions or commands. Remote control 126 may be configured to send alternative signals for the same key (e.g., via IR or RF), depending on whether the aural indication functionality is enabled. Thus, remote control 126 might send three different IR signals for the same button including a first signal for function only, a second signal for function plus aural indication, and a third signal for aural indication only. In all of these variations, STB 121 may be configured to play the audio label regardless of whether the audio channel is muted.

The above disclosed subject matter is to be considered illustrative, and not restrictive, and the appended claims are intended to cover all such modifications, enhancements, and other embodiments which fall within the true spirit and scope of the disclosed subject matter. Thus, to the maximum extent allowed by law, the appended claims are entitled to the broadest permissible interpretation, and should not be restricted or limited by the foregoing detailed description.

What is claimed is:

1. A multimedia receiver, comprising:
a remote control interface operable to receive a wirelessly transmitted remote control command;
a processor coupled to the remote control interface; and
memory including processor-executable program instructions that, when executed by the processor, cause the processor to perform operations comprising:
generating first programming content output corresponding to a first program associated with a first channel of a multimedia content distribution network;
responsive to a remote control command detected by the remote control interface:
generating second programming content output corresponding to a second program associated with a second channel of the network;
generating an audible message announcing the second program;
responsive to detecting an incoming telephone call, generating an audible message indicative of the telephone call;
responsive to detecting an event associated with a recording of a requested program, generating an audible message indicative of the event; and
responsive to detecting a current signal from the remote control indicative of a remote control button and a most recent previous signal from the remote control indicative of an audio next button, generating an audible message indicative of the remote control button.

2. The receiver of claim 1, wherein generating a particular audible message includes:
  determining if a customized audio feature is enabled; and
  responsive to determining the customized audio feature is enabled, generating the particular audible message with a voice familiar to a user, wherein the voice is selected from an acquaintance of the user and a celebrity known to the user.

3. The receiver of claim 1, wherein generating a particular audible message includes invoking a speech synthesis module.

4. The receiver of claim 1, wherein generating a particular audible message includes indexing stored audio files to retrieve an audio file corresponding to the remote control command.

5. The receiver of claim 1, wherein the operations include:
  retrieving metadata associated with the second program and wherein the audible message indicative of the second program is indicative of at least some of the metadata.

6. The receiver of claim 1, wherein the operations include:
  responsive to:
    detecting the current signal from the remote control; and
    determining receipt of no previous signal indicative of the remote control button:
  generating an audible message indicative of the remote control button.

7. A method comprising:
  generating, by a set top box, first programming content output corresponding to a first program associated with a first channel of a multimedia content distribution network;
  responsive to a remote control command detected by a remote control interface:
    generating second programming content output corresponding to a second program associated with a second channel of the multimedia content distribution network; and
    generating an audible message announcing the second program;
  responsive to detecting an incoming telephone call, generating an audible message indicative of the telephone call; and
  responsive to detecting an event associated with a recording of a requested program, generating an audible message indicative of the event
  responsive to detecting:
    a current signal from the remote control indicative of a remote control button; and
    a most recent previous signal from the remote control indicative of an audio next button,
  generating an audible message indicative of the remote control button.

8. The method of claim 7, wherein generating a particular audible message includes:
  determining if a customized audio feature is enabled; and
  responsive to determining the customized audio feature is enabled, generating the particular audible message with a voice familiar to a user, wherein the voice is selected from an acquaintance of the user and a celebrity known to the user.

9. The method of claim 7, wherein generating a particular audible message includes invoking a speech synthesis module.

10. The method of claim 7, wherein generating a particular audible message includes indexing stored audio files to retrieve an audio file corresponding to the remote control command.

11. The method of claim 7, further comprising:
  retrieving metadata associated with the second program and wherein the audible message indicative of the second program is indicative of at least some of the metadata.

12. The method of claim 7, further comprising:
  responsive to:
    detecting the current signal from the remote control; and
    determining receipt of no previous signal indicative of the remote control button,
  generating an audible message indicative of the remote control button.

13. A computer readable memory including processor executable instructions that, upon execution by a processor, cause the processor to perform operations, comprising:
  generating, by a set top box, first programming content output corresponding to a first program associated with a first channel of a multimedia content distribution network;
  responsive to a remote control command detected by a remote control interface:
    generating second programming content output corresponding to a second program associated with a second channel of the multimedia content distribution network; and
    generating an audible message announcing the second program;
  responsive to detecting an incoming telephone call, generating an audible message indicative of the telephone call; and
  responsive to detecting an event associated with a recording of a requested program, generating an audible message indicative of the event
  responsive to detecting:
    a current signal from the remote control indicative of a remote control button; and
    a most recent previous signal from the remote control indicative of an audio next button,
  generating an audible message indicative of the remote control button.

14. The computer readable medium of claim 13, wherein generating a particular audible message includes:
  determining if a customized audio feature is enabled; and
  responsive to determining the customized audio feature is enabled, generating the particular audible message with a voice familiar to a user, wherein the voice is selected from an acquaintance of the user and a celebrity known to the user.

15. The computer readable medium of claim 13, wherein generating a particular audible message includes invoking a speech synthesis module.

16. The computer readable medium of claim 13, wherein generating a particular audible message includes indexing stored audio files to retrieve an audio file corresponding to the remote control command.

17. The computer readable medium of claim 13, wherein the operations include:
  retrieving metadata associated with the second program and wherein the audible message indicative of the second program is indicative of at least some of the metadata.

* * * * *